US006954652B1

(12) United States Patent
Sakanashi

(10) Patent No.: US 6,954,652 B1
(45) Date of Patent: Oct. 11, 2005

(54) PORTABLE TELEPHONE APPARATUS AND AUDIO APPARATUS

(75) Inventor: Kenji Sakanashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/547,901

(22) Filed: Apr. 11, 2000

(30) Foreign Application Priority Data

Apr. 13, 1999 (JP) ................................. 11-105175

(51) Int. Cl.$^7$ .............................................. H04B 1/38
(52) U.S. Cl. ...................... 455/550.1; 455/72; 455/563
(58) Field of Search .......................... 455/550.1, 412.1, 455/413, 414.1, 462, 466, 556.1, 556.2, 557, 455/544, 572, 574, 95, 575, 3.06, 414.4, 455/221, 72, 575.1, 575.6; 381/311, 315, 381/334, 337

(56) References Cited

U.S. PATENT DOCUMENTS

| | | | | |
|---|---|---|---|---|
| 5,572,442 A | * | 11/1996 | Schulhof et al. ............ | 709/219 |
| 5,956,655 A | * | 9/1999 | Suzuki et al. ............... | 455/566 |
| 5,982,764 A | * | 11/1999 | Palermo et al. ............. | 370/345 |
| 6,167,251 A | * | 12/2000 | Segal et al. .................. | 455/406 |
| 6,425,018 B1 | * | 7/2002 | Kaganas et al. ................ | 710/1 |
| 6,556,965 B1 | * | 4/2003 | Borland et al. .......... | 704/200.1 |

FOREIGN PATENT DOCUMENTS

| | | |
|---|---|---|
| JP | 02079648 | 3/1990 |
| JP | 03003538 | 1/1991 |
| JP | 05145605 | 6/1993 |
| JP | 053362644 | 12/1993 |
| JP | 06006285 | 1/1994 |
| JP | 06209281 | 7/1994 |
| JP | 6260995 | 9/1994 |
| JP | 7212829 | 8/1995 |
| JP | 7271692 | 10/1995 |
| JP | 08251258 | 9/1996 |
| JP | 09055817 | 2/1997 |
| JP | 09224075 | 8/1997 |
| JP | 10004442 | 1/1998 |
| JP | 10013243 | 1/1998 |
| JP | 10150505 | 6/1998 |

(Continued)

OTHER PUBLICATIONS

Japanese Office Action dated Jan. 29, 2002 with English translation.

(Continued)

*Primary Examiner*—Edward Urban
*Assistant Examiner*—Thuan Nguyen
(74) *Attorney, Agent, or Firm*—Stevens, Davis, Miller & Mosher, LLP

(57) ABSTRACT

A portable telephone apparatus usable both for telephone and hearing music is disclosed, including an antenna for holding communication with a base station or a parent unit, a voice input unit such as a microphone, a voice output unit such as a speaker, an operating unit including keys and a display unit manipulated by a user operating the apparatus, a telephone control unit for modulating a radio signal from the voice input unit and outputting the modulated signal to the antenna and demodulating the radio signal received through the antenna, extracting a voice signal and outputting the voice signal, a chargeable battery for supplying power to the apparatus, a storage unit for storing the compressed music data, a data restoration unit for reading, expanding and reproducing as a music signal the data stored in the storage unit, and a switching unit for selecting the voice signal demodulated by the telephone control unit or the music signal reproduced by the data restoration unit and outputting the selected signal to the voice output unit.

14 Claims, 8 Drawing Sheets

FOREIGN PATENT DOCUMENTS

| | | |
|---|---|---|
| JP | 10173764 | 6/1998 |
| JP | 10178745 | 6/1998 |
| JP | 10210139 | 8/1998 |
| JP | 10327219 | 12/1998 |
| JP | 11055751 | 2/1999 |
| JP | 11068994 | 3/1999 |
| JP | 11154994 | 6/1999 |
| JP | 11168534 | 6/1999 |
| JP | 11252213 | 9/1999 |
| JP | 2000106593 | 4/2000 |
| JP | 2000151825 | 5/2000 |
| JP | 2000293182 | 10/2000 |
| JP | 2000312388 | 11/2000 |

OTHER PUBLICATIONS

Japanese Office Action dated Feb. 25, 2003 with English translation.

Japanese Office Action dated May 20, 2003 with English translation.

\* cited by examiner

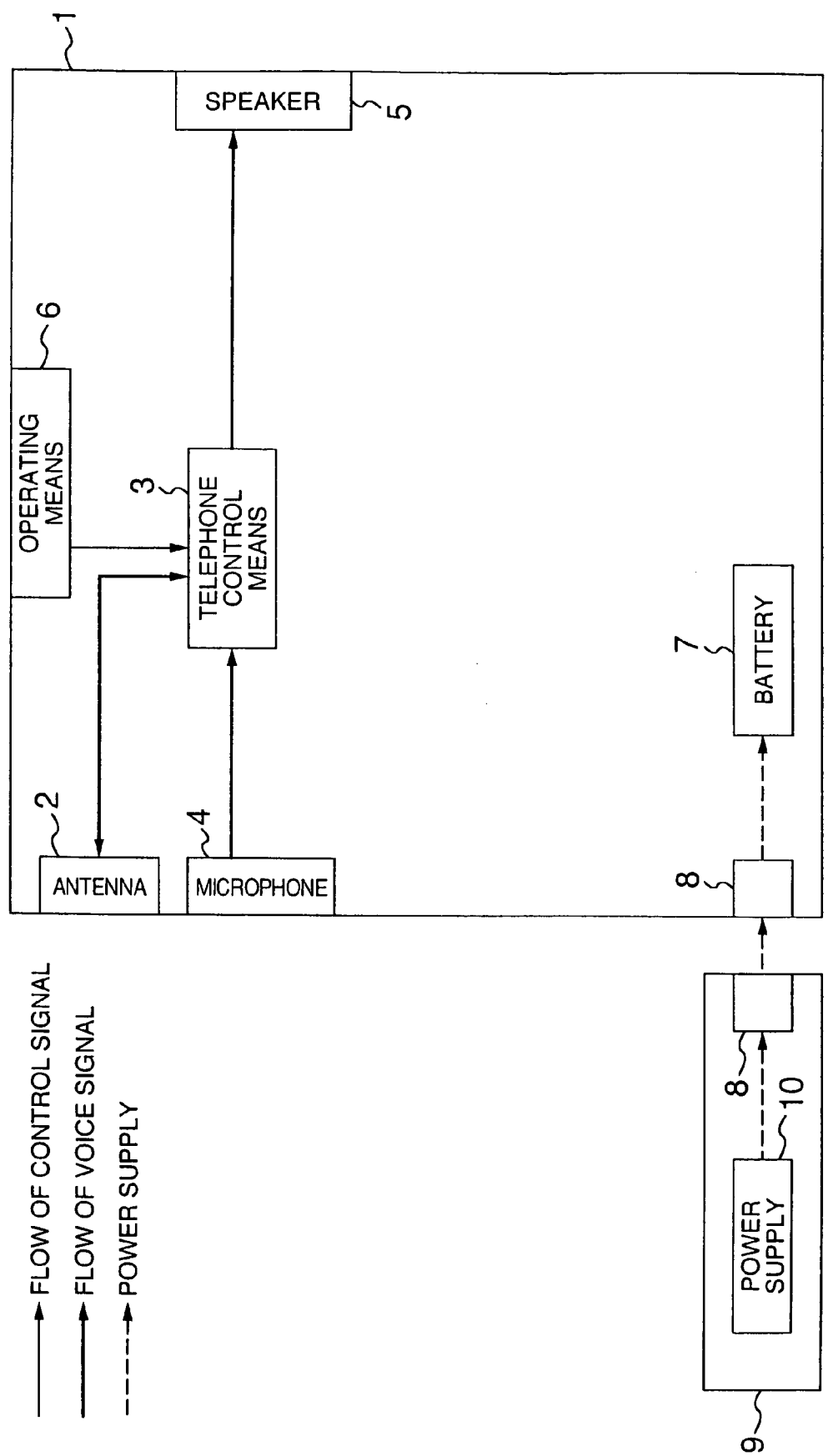

PORTABLE TELEPHONE APPARATUS AND AUDIO APPARATUS

FIELD OF THE INVENTION

The present invention relates to a portable telephone apparatus (including a PHS and a cordless telephone) capable of reproducing a music, and an audio apparatus.

BRIEF DESCRIPTION OF THE DRAWINGS

FIG. 8 is a block diagram of a portable telephone apparatus and peripheral devices according to the prior art.

Figure 1:
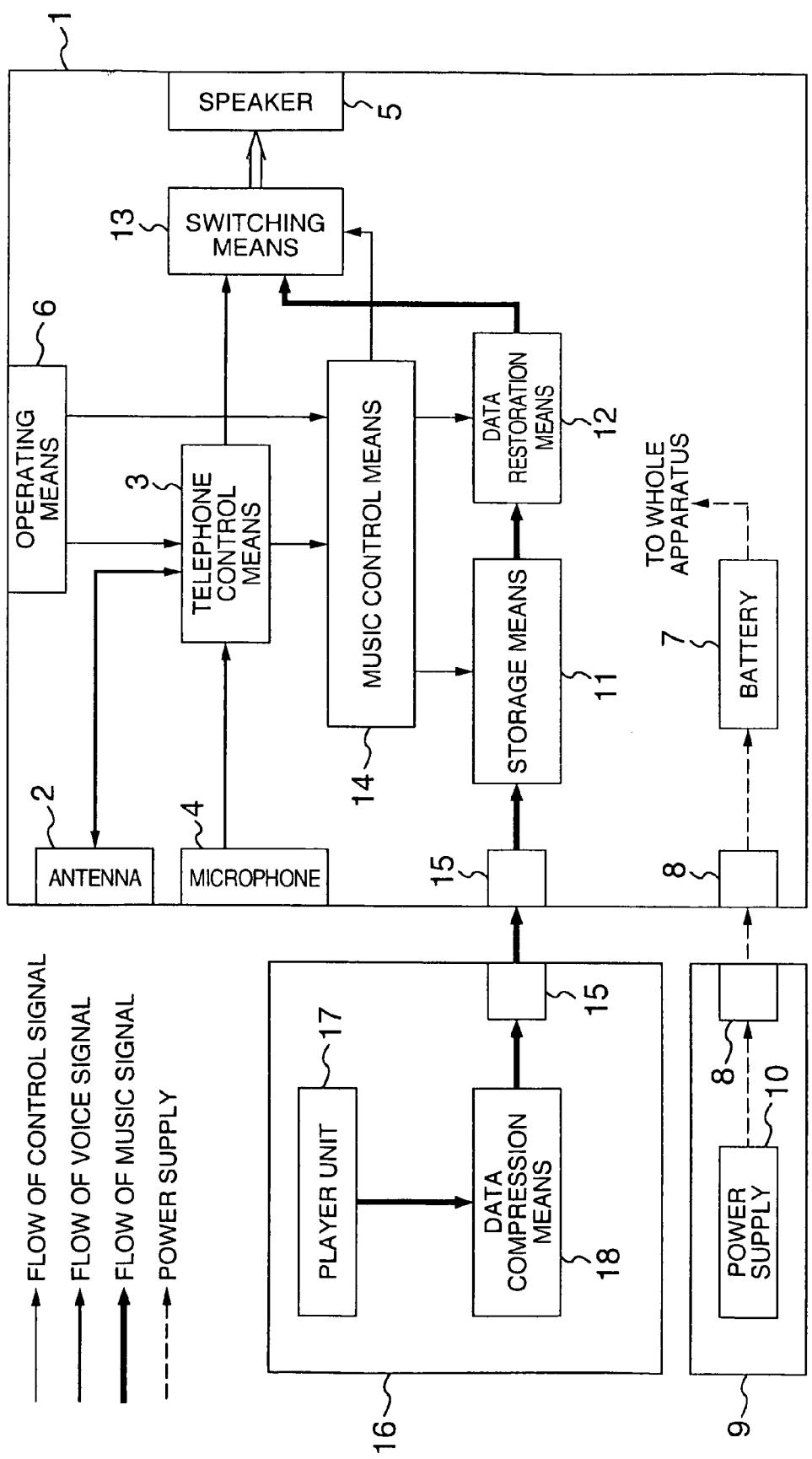
FIG. 1 is a block diagram of a portable telephone apparatus and peripheral devices according to a first embodiment of the invention.

A block diagram of a portable telephone apparatus and peripheral devices according to the prior art is shown in FIG. 8.

BACKGROUND OF THE INVENTION

In FIG. 8, reference numeral 1 designates a portable telephone apparatus (child unit), numeral 2 an antenna for holding communication with a base station (or a parent unit), numeral 3 telephone control means for controlling the modulation/demodulation and the transmission/reception of a voice signal, numeral 4 a microphone, numeral 5 a speaker (or a headphone/earphone), numeral 6 operating means including keys and a liquid crystal display unit operated by the user, numeral 7 a battery, numeral 8 power supply means for supplying power to the portable telephone apparatus 1 from a charger 9, numeral 9 the charger for charging the portable telephone apparatus 1, and numeral 10 a power supply unit for generating the DC power of the voltage required for charging the portable telephone.

The operation of the conventional portable telephone apparatus will be described. When the portable telephone apparatus 1 is used, the user first turns the telephone off-hook by the operating means 6, and dials a desired number. This information is modulated by the telephone control means 3, and transmitted from the antenna 2 by radio to the base station (or the parent unit), and when it is connected to the called party, the apparatus enters a busy mode. A voice of the user in busy mode is input from the microphone 4, modulated by the telephone control means 3 and transmitted to the base station by radio. Conversely, a voice of the other party is inputted to the antenna 2 by radio from the base station, demodulated by the telephone control means 3 and outputted from the speaker 5. Upon termination of the busy mode, the apparatus is turned on-hook state by the operating means 6 thereby to disconnect the channel.

Also, in the case where the battery 7 is so consumed that it requires charging in busy mode, the charger 9 sets the portable telephone apparatus 1, and charges the battery 7 through the power supply means 8 from the power supply unit 10. The power supply means 8 may be an electrode-contacting type, but the contactless type using an induction coil is in current mainstay.

SUMMARY OF THE INVENTION

The portable telephone apparatus having the configuration described above, however, has only the basic function of transmitting/receiving the voice, but no function of reproducing the music. The user, who wants to use both a conventional portable telephone and a portable audio apparatus at the same time, therefore, is required to carry both of them inconveniently. Also, there has been no means for downloading music data to the portable telephone apparatus.

An object of the present invention is to solve the above-mentioned problems and to provide a portable telephone apparatus in which both the conversation can be held and the music can be heard.

In order to achieve the object, a portable telephone apparatus according to this invention comprises storage means for storing compressed music data and data restoration means for reading and expanding the data stored in the storage means and reproducing it as a music signal. Both the function as a telephone and the function of reproducing the music can be realized with a single device. The user can enjoy the music by carrying a single portable telephone apparatus.

According to claim 1 of the invention, there is provided a portable telephone apparatus comprising:

an antenna for holding communication with a base station or a parent unit;

voice input means such as a microphone;

voice output means such as a speaker or a headphone;

operating means including keys and a display unit used by the user operating the apparatus;

telephone control means for modulating the voice signal from the voice input means and outputting the modulated signal to the antenna on one hand and demodulating the radio signal received by way of the antenna, extracting the voice signal and outputting the voice signal to the voice output means on the other hand;

a chargeable battery for supplying power to the whole apparatus;

storage means for storing the compressed music data; and data restoration means for reading and expanding the data stored in the storage means, reproducing the data as a music signal and outputting the music signal to the voice output means;

wherein the music supplied from another audio apparatus are compressed and stored in the storage means in the portable telephone apparatus, and the user reads the data stored in the storage means through the operating means, which data are expanded by the data restoration means and can be reproduced through the voice output means such as the speaker or the headphone.

According to another embodiment of the invention, there is provided a portable telephone apparatus comprising:

an antenna for holding communication with a base station or a parent unit;

voice input means such as a microphone;
voice output means such as a speaker or a headphone;
operating means including keys and a display unit used by the user operating the apparatus;
telephone control means for modulating the voice signal from the voice input means and outputting the modulated signal to the antenna on one hand and demodulating the radio signal received through the antenna, extracting the voice signal and outputting the voice signal on the other hand;
a chargeable battery for supplying power to the whole apparatus;
storage means for storing the compressed music data;
data restoration means for reading and expanding the data stored in the storage means and reproducing the data as a music signal; and
switching means for selecting the voice signal demodulated by the telephone control means or the music signal reproduced by the data restoration means and outputting the selected signal to the voice output means;
wherein the operation of the switching means for switching and selecting the signal is performed through the operating means;
wherein the compressed music data are downloaded to the storage means in the portable telephone apparatus, and the user reads the data from the storage means through the operating means, which data are expanded by the data restoration means and can be reproduced as a music signal. Also, in the case where the switching means selects the music signal, the reproduced music is produced from the voice output means. Otherwise, a voice signal of the telephone set from the telephone control means is selected. The switching means may be operated by the user manipulating the keys, or the telephone voice signal can be automatically selected in off-hook state, judging from the busy mode of the telephone set.

According to claim 10 of the invention; there is provided a portable telephone apparatus comprising:
an antenna for holding communication with a base station or a parent unit;
voice input means such as a microphone;
voice output means such as a speaker or a headphone;
operating means including keys and a display unit manipulated by the user operating the apparatus;
telephone control means for modulating the voice signal from the voice input means and outputting the modulated signal to the antenna on one hand and demodulating the radio signal received through the antenna, extracting the voice signal and outputting the voice signal on the other hand;
a chargeable battery for supplying power to the whole apparatus;
storage means for storing the compressed music data;
data restoration means for reading and expanding the data stored in the storage means and reproducing the data as a music signal;
first mixing means for mixing the voice signal from the voice input means with the music signal reproduced by the data restoration means and outputting a mixture signal to the telephone control means; and
second mixing means for mixing the voice signal demodulated by the telephone control means with the music signal reproduced by the data restoration means and outputting a mixture signal to the voice output means;
wherein the mixing ratio in the mixing means is variable by the operation of the operating means;
wherein the data stored in the storage means is read and reproduced by the voice output means, the voice signal received by the antenna and demodulated by the telephone control means can be mixed with the music signal and outputted from the voice output means, and the voice signal from the voice input means can be mixed with the music signal and outputted to the radio channel, so that the music can be enjoyed even when the line is busy.

According to claim 11 of the invention, there is provided a portable telephone apparatus comprising:
an antenna for holding communication with a base station or a parent unit;
voice input means such as a microphone;
voice output means such as a speaker or a headphone;
operating means including keys and a display unit manipulated by the user operating the apparatus;
telephone control means for modulating the voice signal from the voice input means and outputting the modulated signal to the antenna on one hand and demodulating the radio signal received through the antenna, extracting the voice signal and outputting the voice signal on the other hand;
a chargeable battery for supplying power to the whole apparatus;
storage means for storing the compressed music data;
data restoration means for reading and expanding the data stored in the storage means and reproducing the data as a music signal;
first mixing means for mixing the voice signal from the voice input means with the music signal reproduced by the data restoration means and outputting a mixture signal to the telephone control means;
second mixing means for mixing the voice signal demodulated by the telephone control means with the music signal reproduced by the data restoration means and outputting a mixture signal to the voice output means; and
means for changing the mixing ratio in the mixing means according to the busy mode of the telephone set;
wherein the data stored in the storage means is read and reproduced by the voice output means, and when the telephone set is off-hook, the telephone voice signal can be automatically selected.

According to claim 12 of the invention, there is provided a portable telephone apparatus comprising:
an antenna for holding communication with a base station or a parent unit;
voice input means such as a microphone;
voice output means such as a speaker or a headphone;
operating means including keys and a display unit manipulated by the user operating the apparatus;
telephone control means for modulating the voice signal from the voice input means and outputting the modulated signal to the antenna on one hand and demodulating the radio signal received through the antenna, extracting the voice signal and outputting the voice signal on the other hand;
a chargeable battery for supplying power to the whole apparatus;
storage means for storing the compressed music data;
data restoration means for reading and expanding the data stored in the storage means and reproducing the data as a music signal;

first mixing means for mixing the voice signal from the voice input means with the music signal reproduced by the data restoration means and outputting a mixture signal to the telephone control means;

second mixing means for mixing the voice signal demodulated by the telephone control means with the music signal reproduced by the data restoration means and outputting a mixture signal to the voice output means; and means for increasing the mixing ratio of the music signal in the first mixing means in the case where the busy mode is suspended by the operating means;

wherein in the case where the busy mode is suspended, the music can be furnished as a suspension message to the other party.

According to another embodiment of the invention, there is provided a portable telephone apparatus comprising:

an antenna for holding communication with a base station or a parent unit;

voice input means such as a microphone;

voice output means such as a speaker or a headphone;

operating means including keys and a display unit manipulated by the user operating the apparatus;

telephone control means for modulating the voice signal from the voice input means and outputting the modulated signal to the antenna on one hand and demodulating the radio signal received through the antenna, extracting the voice signal and outputting the voice signal to the voice output means on the other hand;

a chargeable battery for supplying power to the whole apparatus;

storage means for storing the compressed music data;

data restoration means for reading and expanding the data stored in the storage means, reproducing the data as a music signal and outputting the music signal to the voice output means; and wire, radio or optical communication means for downloading the compressed music data to the storage means from an external source;

wherein the music selected by the user from another audio apparatus can be compressed, and the compressed music data is downloaded to the storage means in the portable telephone apparatus by the communication means, so that the compressed music data can be stored in the storage means of the portable telephone apparatus and reproduced by the voice output means including the speaker or the headphone.

According to another embodiment of the invention, there is provided a portable telephone apparatus comprising:

an antenna for holding communication with a base station or a parent unit;

voice input means such as a microphone;

voice output means such as a speaker or a headphone;

operating means including keys and a display unit manipulated by the user operating the apparatus;

telephone control means for modulating the voice signal from the voice input means and outputting the modulated signal to the antenna on one hand and demodulating the radio signal received through the antenna, extracting the voice signal and outputting the voice signal to the voice output means on the other hand;

a chargeable battery for supplying power to the whole apparatus;

storage means for storing the compressed music data;

data restoration means for reading and expanding the data stored in the storage means, reproducing the data as a music signal and outputting the music signal to the voice output means;

wherein not only the telephone voice but the music data contained in the radio wave arriving from the base station or the parent unit is demodulated by the telephone control means and stored in the storage means, thereby making it possible to download the music data sent from another audio apparatus through the telephone line, the base station or the parent unit to the storage means in the portable telephone apparatus.

According to another embodiment of the invention, there is provided an audio apparatus comprising:

data compression means for compressing the music data into a format expandable by the data restoration means through the conversion process corresponding to the recording scheme of at least one of a plurality of audio media including CD, MD and the cassette tape; and communication means capable of downloading the compressed music data to the portable telephone apparatus;

wherein the conversion process corresponding to the recording scheme of each medium makes it possible to connect the audio apparatus to the portable telephone apparatus and download the music data to the portable telephone apparatus by the communication means, and therefore the user can enjoy a high quality music by use of the portable telephone apparatus.

According to another embodiment of the invention, there is provided an audio apparatus comprising:

data compression means for compressing a music data into a format expandable by the data restoration means through the conversion process corresponding to the recording scheme of at least one of a plurality of audio media including CD, MD and the cassette tape;

removable storage means; and means for writing the compressed music data into the removable storage means;

wherein the removable storage means can be removed from the audio apparatus and mounted on the portable telephone apparatus so that the user can enjoy the high quality music by use of the portable telephone apparatus.

According to another embodiment of the invention, there is provided an audio apparatus comprising:

data compression means for compressing a music data into a format expandable by the data restoration means through the conversion process corresponding to the recording scheme of at lease one of a plurality of audio media including CD, MD and the cassette tape; and a power supply unit for charging the battery;

wherein the music data can be downloaded while at the same time the battery is charged. Since the audio apparatus is integrated with the charger and the compressed music data can be downloaded while the portable telephone apparatus is combined with the audio apparatus for the purpose of charging, the operation time can be shortened.

DESCRIPTION OF THE EMBODIMENTS

Embodiment 1

A portable telephone apparatus according to an embodiment of the invention will be described with reference to the drawings. FIG. 1 is a block diagram showing a portable telephone apparatus and peripheral devices according to a first embodiment of the invention. In FIG. 1, numerals 1 to 10 designate components parts having the same function as the corresponding parts of the conventional apparatus, which with the same reference numerals attached thereto, will not be described. Numeral 11 designates a memory such as a flush ROM constituting storage means for storing the compressed music data, numeral 12 data restoration means for reading and expanding the music data stored in the storage means, converting them into an analog signal, and reproducing them as a music signal, numeral 13 switching means for switching between the voice signal demodulated by the telephone control means 3 and the music signal reproduced by the data restoration means 12 in response to a switching signal from music control means 14 and outputting the selected signal to the speaker 5, numeral 14 the music control means for controlling the storage means 11 and the data restoration means 12 by the control signal from the operating means 6 or the telephone control means 14, numeral 15 communication means for downloading the compressed music data from an external source, numeral 16 an audio apparatus having the function of reproducing the music source and compressing it as data, numeral 17 a player unit for reproducing various media such as CD, MD or cassette tape, processing the signal in a way corresponding to each type of medium, and outputting the signal in a predetermined digital format, and numeral 18 data compression means for compressing the output of the player into a format that can be restored by the data restoration means 12.

An operation of the portable telephone apparatus having the aforementioned configuration will be described.

The operation of the telephone set using the portable telephone apparatus 1 is substantially the same as the operation in the prior art. The exception is that the switching means 13 is inserted before the speaker 5 for selecting the voice signal or the music signal according to whether the telephone set is in off-hook or not and outputs the resulting signal to the speaker 5. Specifically, in response to the control signal from the operating means 6 and the telephone control means 3, the music control means 14 determines whether the telephone set is in off-hook or not and notifies the result of determination to the switching means 13. In the case where the telephone set is in off-hook, the switching means 13 selects the voice signal, and otherwise, selects the music signal from the data restoration means 12. Now, the music reproducing operation by the portable telephone apparatus 1 according to this embodiment will be described.

First, the compressed music data input through the downloading communication means 15 are accumulated in the storage means 11. The user selects a desired musical number through the operating means 6, and the result is notified to the music control means 14. The music control means 14 causes outputs the storage means 11 to output the data of the corresponding portion, and expanding and converting it into an analog signal in the data restoration means 12, reproduces it as a music signal. In the process, the switching means 13 selects the music signal and the music begins to pour out from the speaker 5. In the case where the earphone of headphone type which begins to be widely used is employed, the user can enjoy the music more. Even in the case where the speaker 5 is monaural, the communication means 15, the storage means 11 and the data restoration means 12 are desirably configured as stereophonic means in case of hearing the music through the earphone of headphone type.

In the case where the need arises of sending a call or a call arrives during the reproduction of the music, the user turns the phone into off-hook by the operating means 6. As a result, the switching means 13 selects the voice signal as described above, and thus the speech can be started. Upon complete speech and when the telephone set turns on-hook, the switching means 13 selects the music signal again so that the music can be reproduced from the speaker 5.

During this interruption due to the busy mode, the following choices are available for reproducing the music.

(1) While the telephone set is in off-hook, the storage means 11 and the data restoration means 12 are reset to an initial state, and when the telephone set turns on-hook, a number is selected anew.

(2) As soon as the telephone set turns off-hook, the operation of the storage means 11 and the data restoration means 12 are suspended, while when the telephone set turns on-hook, the operation is continued.

(3) Also during the off-hook state, the operation of the storage means 11 and the data restoration means 12 is continued, but the switching means 13 is switched.

Each of the choices has an advantage and disadvantage, and any one of them may be used. Desirably, the apparatus is so configured that the user can set his choice.

The storage means 11 is configured to read/write the telephone data such as the abbreviated dial and the data such as memo data produced by the operating means 6 as well as the music data.

The operation of compressing and downloading the music data according to this embodiment will be described.

The audio apparatus 16 is assumed to include a player unit 17 corresponding to at least one of a plurality of media including the CD, MD, cassette tape and the DAT. The player unit 17 converts the output of any type of the medium into a predetermined digital format such as WAVE which can be compressed by the data compression means 18. For this purpose, the digitizing operation such as sampling is performed for the analog medium including the cassette tape. For other digital media, too, the output thereof is converted into the predetermined digital format described above by manipulating the format of the music data recorded.

In the data compression means 18, the input music data is compressed and the data amount reduced in order to reduce the time required for downloading or the capacity of the storage means 11.

Any method of compressing the music data can be employed as far as it matches the data restoration means 12.

MP3 (MPEG1 Audio Layer 3), for example, is desirable as the data amount can be compressed to about one tenth with the sound quality maintained at a level equivalent to CD. Other appropriate compression methods can also be selected in relation to the capacity of the storage means 11. With the increase in the capacity and reduction in a price of the storage means 11, a method may become available in which the data is downloaded directly to the storage means 11 without any compression or expansion in the data restoration means 12.

The music data compressed in the manner described above is downloaded to the storage means 11 in the portable telephone apparatus 1 by the communication means 15. The communication means 15 may be of any type including wired, radio or optical, as far as it has an interface matching the portable telephone apparatus 1 such as RS232 or IrDA.

The charging operation according to this embodiment is similar to that in the prior art.

Embodiment 2

Figure 2:
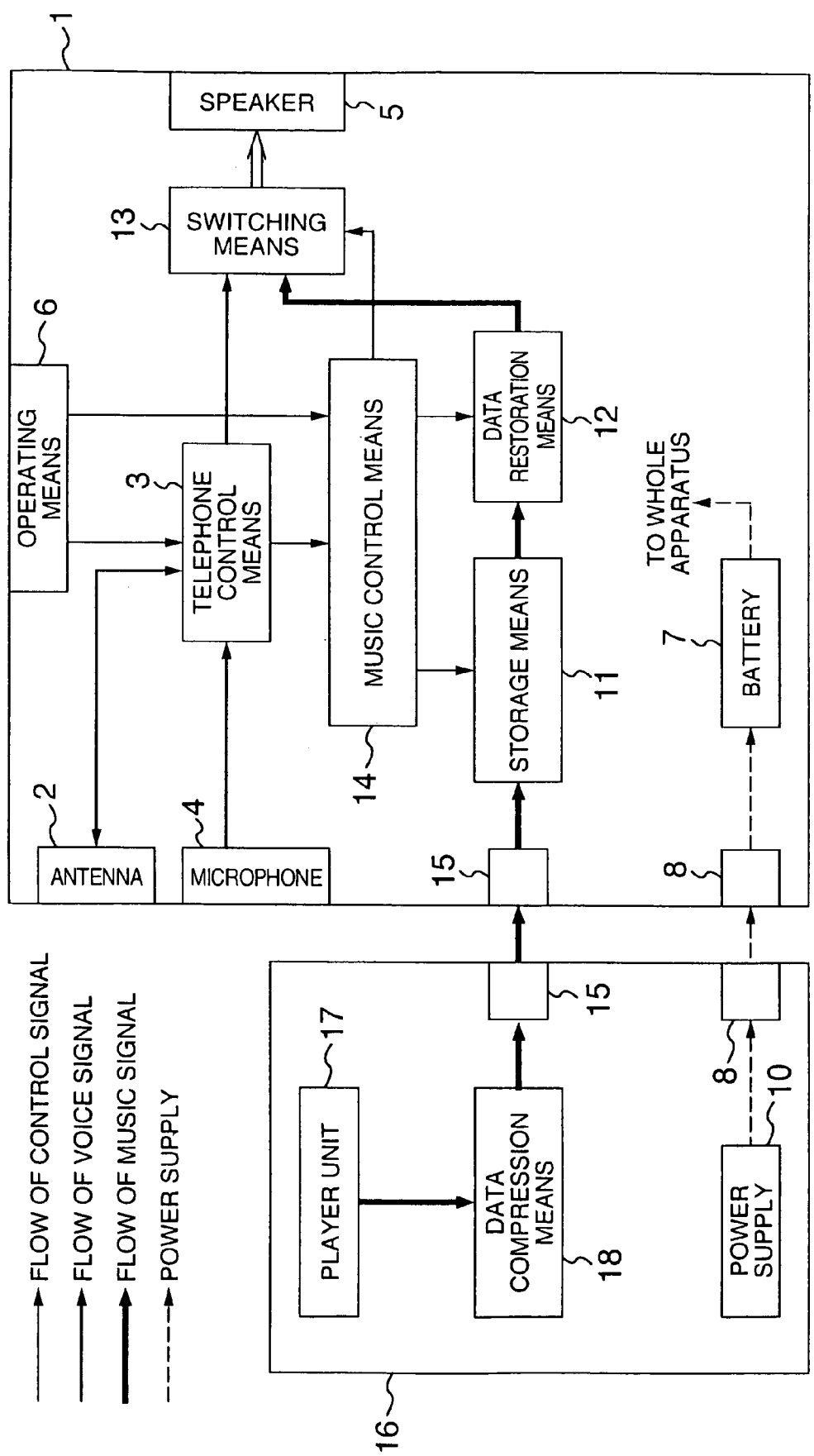
FIG. 2 is a block diagram of a portable telephone apparatus and peripheral devices according to a second embodiment of the invention.

FIG. 2 is a block diagram showing a portable telephone apparatus and peripheral devices according to a second embodiment of the invention. In FIG. 2, the points different from the first embodiment will be described.

In FIG. 2, the audio apparatus 16 is integrated with the charger 9 shown in FIG. 1. Specifically, with the portable telephone apparatus 1 set in the charger 9, the downloading communication means 15 is connected. This configuration is more functional than that of FIG. 1 as the peripheral devices required for the charging and the downloading of the music data can be grouped into a single set. Also, when arrangement is made to start the charge operation as soon as the downloading is started, the charging time can be reduced while at the same time compensating for the power consumption of the portable telephone apparatus due to the downloading operation.

Embodiment 3

Figure 3:
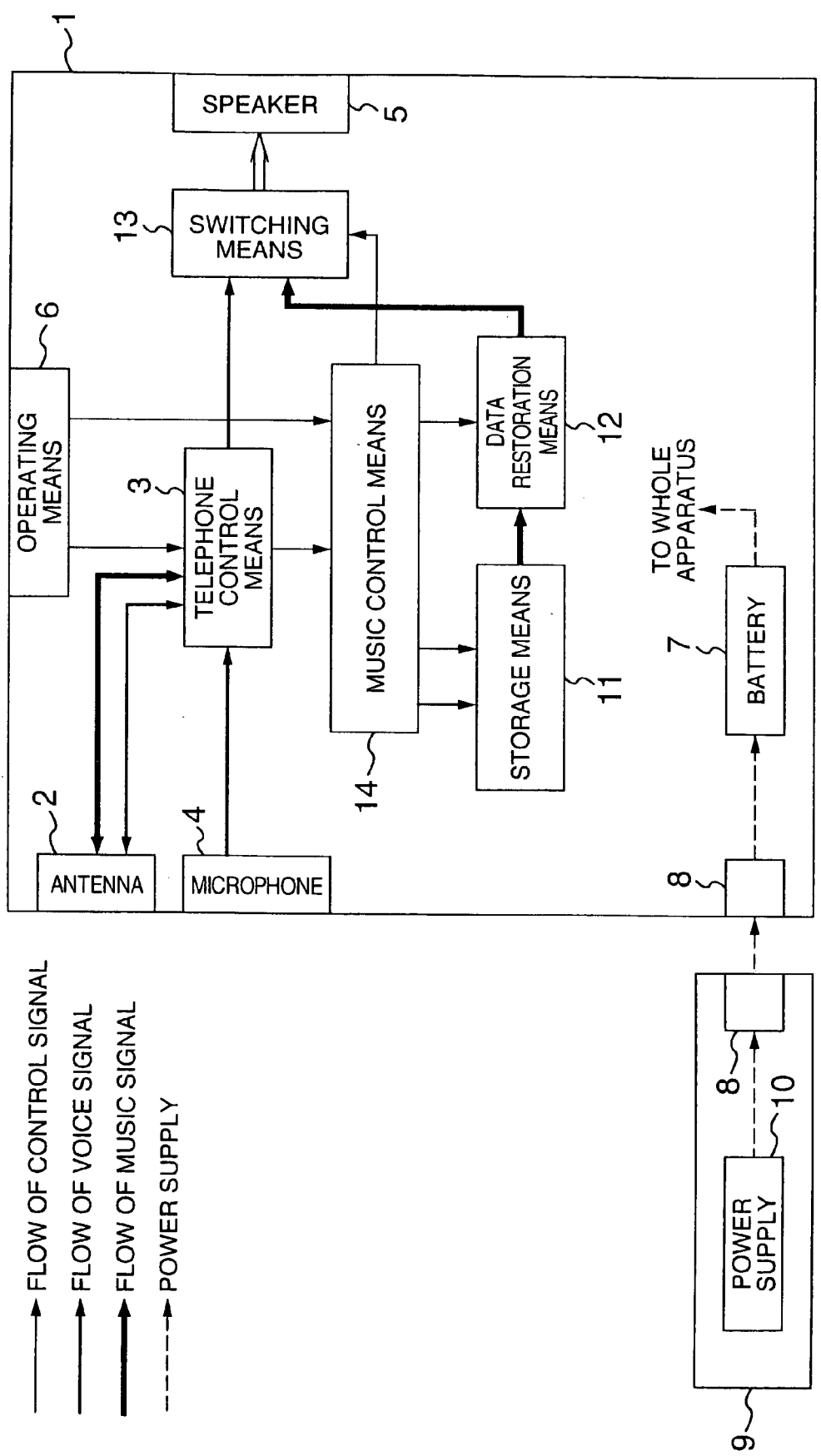
FIG. 3 is a block diagram of a portable telephone apparatus and peripheral devices according to a third embodiment of the invention.

FIG. 3 is a block diagram showing a portable telephone apparatus and peripheral devices according to a third embodiment of the invention. The different points in FIG. 3 from the first embodiment will be described.

In FIG. 3, the method of downloading the music data is different from that of FIG. 1. Specifically, assume that the music data arrives by radio from the base station and is inputted from the antenna. The signal inputted to the antenna 2 is demodulated by the telephone control means 3, and extracted as digital data and accumulated in the storage means 11 through the music control means 14. The user registers a request for a number beforehand in the base station through the operating means 6. The radio wave arriving from the base station carries both the voice signal and the music signal.

Embodiment 4

Figure 4:
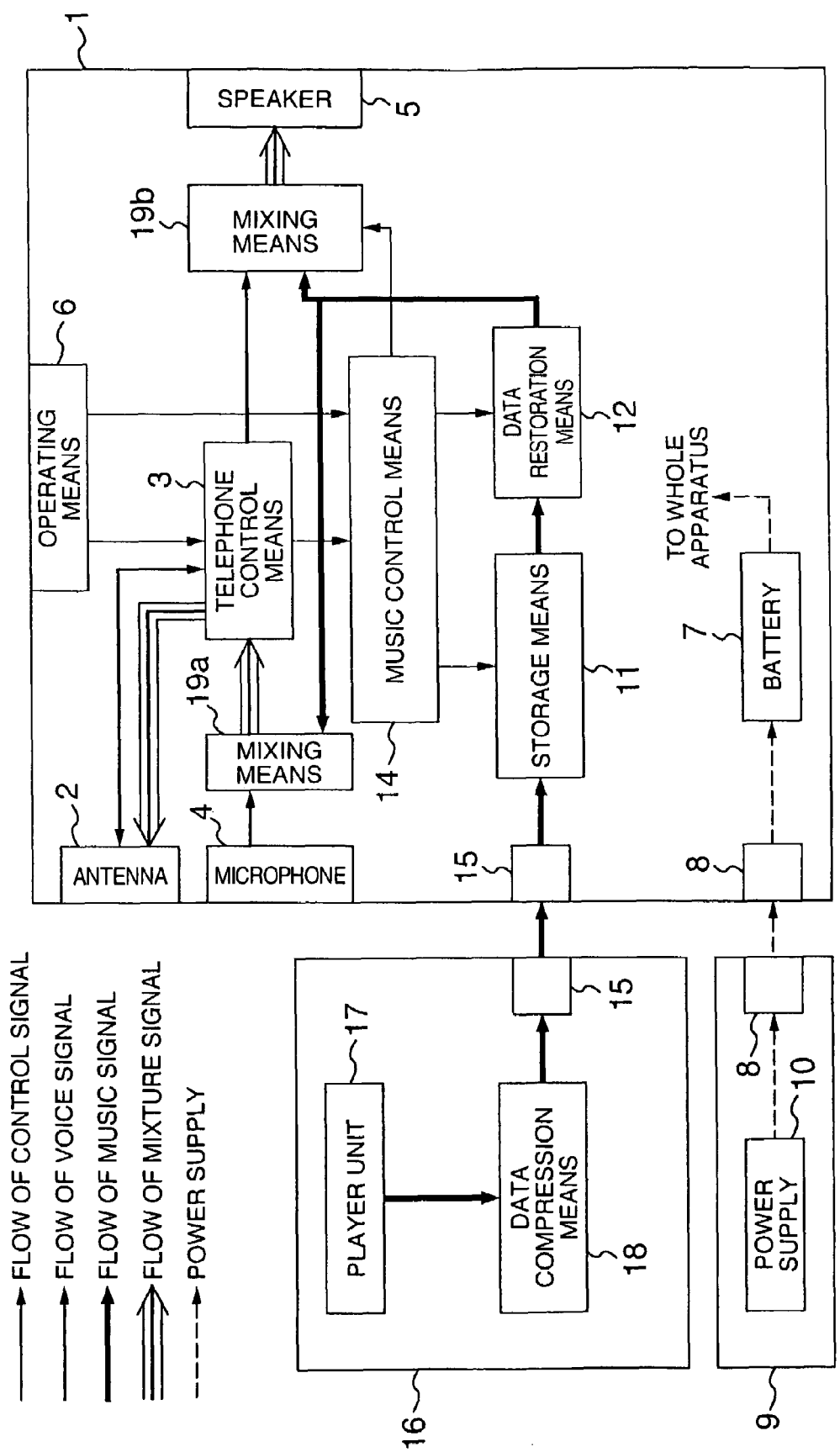
FIG. 4 is a block diagram of a portable telephone apparatus and peripheral devices according to a fourth embodiment of the invention.

FIG. 4 is a block diagram showing a portable telephone apparatus and peripheral devices according to a fourth embodiment of the invention. The difference of the configuration shown in FIG. 4 from the first embodiment will be described below.

In FIG. 4, the switching means 13 of FIG. 1 is replaced by mixing means 19 arranged at two points. The mixing means 19a mixes the voice picked up by the microphone 4 with the music signal, and outputs it to the telephone control means. The mixing means 19b, on the other hand, mixes the voice of the other party outputted from the telephone control means 3 with the music signal and outputs it to the speaker. The mixing ratio is variable according to the control signal from the music control means 14, whereby the two mixing means perform the same function as the switching means of the first embodiment.

The operation of the mixing means 19a permits a voice of the user to be carried with the music to the other party. Also, the operation of the mixing means 19b makes it possible to mix the voice of the other party outputted from the telephone control means 3 with the music and to output it to the speaker. Thus, the conversation with a background music can be enjoyed.

Also, when the speech, i.e. the busy mode is suspended, the music can be furnished to the other party as a waiting message by controlling the mixing means 19a.

Embodiment 5

Figure 5:
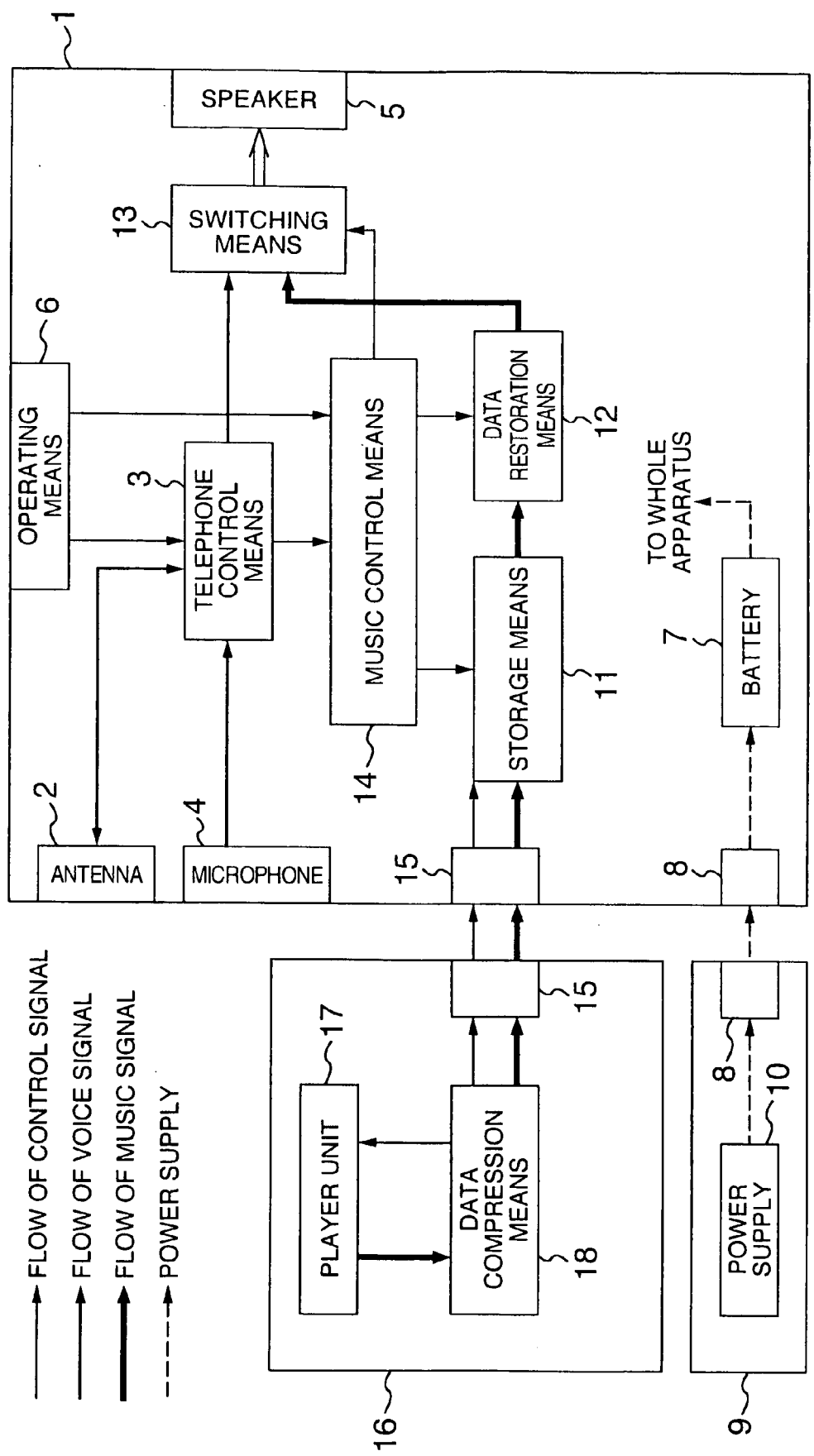
FIG. 5 is a block diagram of a portable telephone apparatus and peripheral devices according to a fifth embodiment of the invention.

FIG. 5 is a block diagram showing a portable telephone apparatus and peripheral devices according to a fifth embodiment of the invention. The points different in FIG. 5 from the first embodiment will be described.

In FIG. 5, the communication means 15 is capable of bidirectional communication, and the information inputted by the operating means 6 can be transmitted to the audio apparatus 16 unlike in FIG. 1. As a result, the retransmission is facilitated in case of communication error which may occur during the downloading operation. Also, the selection of a number to be downloaded and a setting of timing of starting the downloading are also made possible by the operating means 6 of the portable telephone apparatus 1.

Embodiment 6

Figure 6:
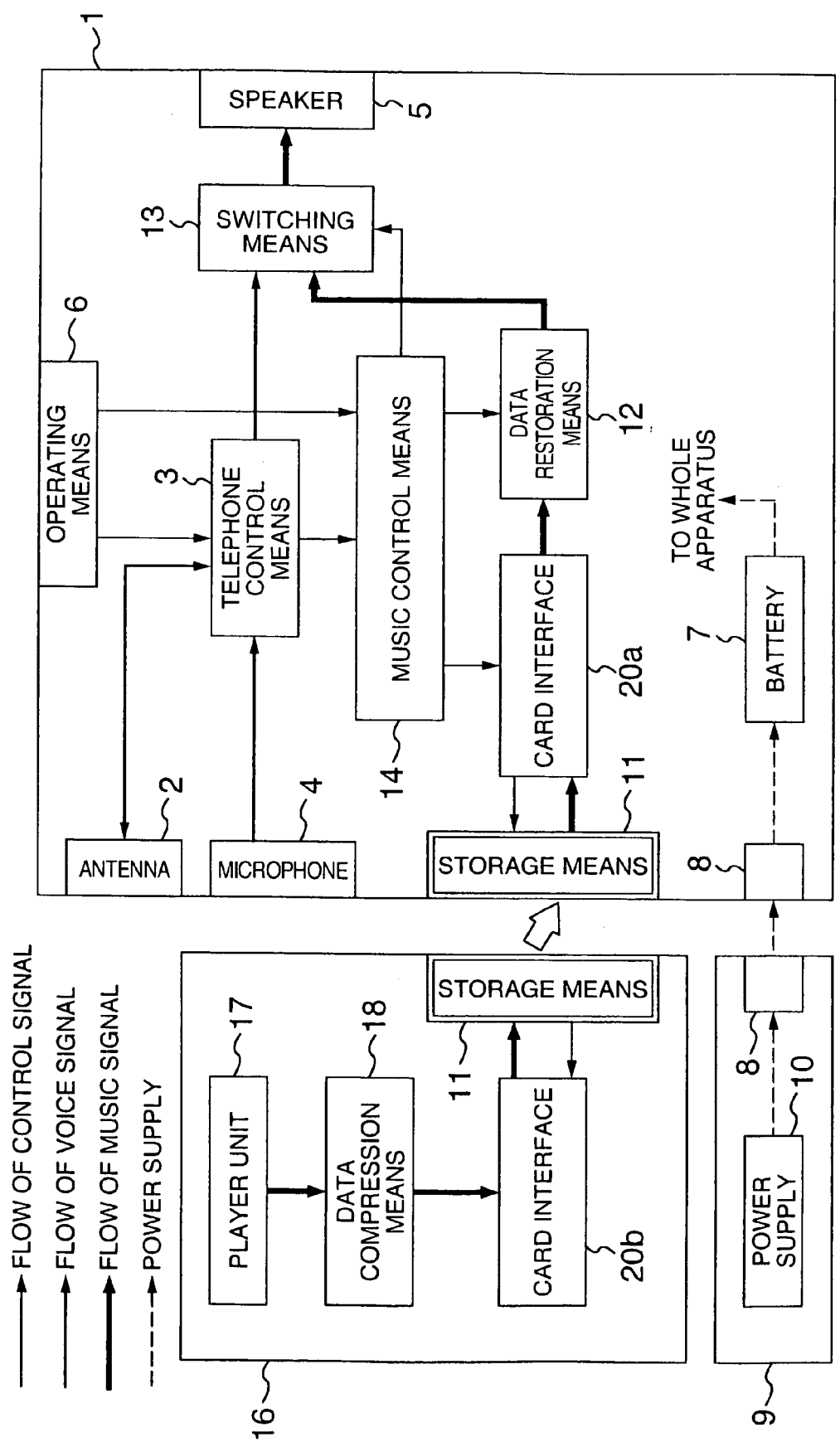
FIG. 6 is a block diagram of a portable telephone apparatus and peripheral devices according to a sixth embodiment of the invention.

FIG. 6 is a block diagram showing a portable telephone apparatus and peripheral devices according to a sixth embodiment of the invention. The points in FIG. 6 different from the first embodiment will be described below.

In FIG. 6, the storage means 11 is assumed to be a device in the form of removable card such as a smart card. The built-in data can be inputted/outputted through the card interface 20. In this case, the music data read from the storage means 11 by the card interface 20a is outputted to the data restoration means 12.

In this case, the music data is written in the storage means 11 by purchasing a prewritten medium and exchanging it to permit the user to enjoy various numbers, or as shown in FIG. 6, the audio apparatus 16 is equipped with the card interface 20b for the user to write by himself.

Embodiment 7

Figure 7:
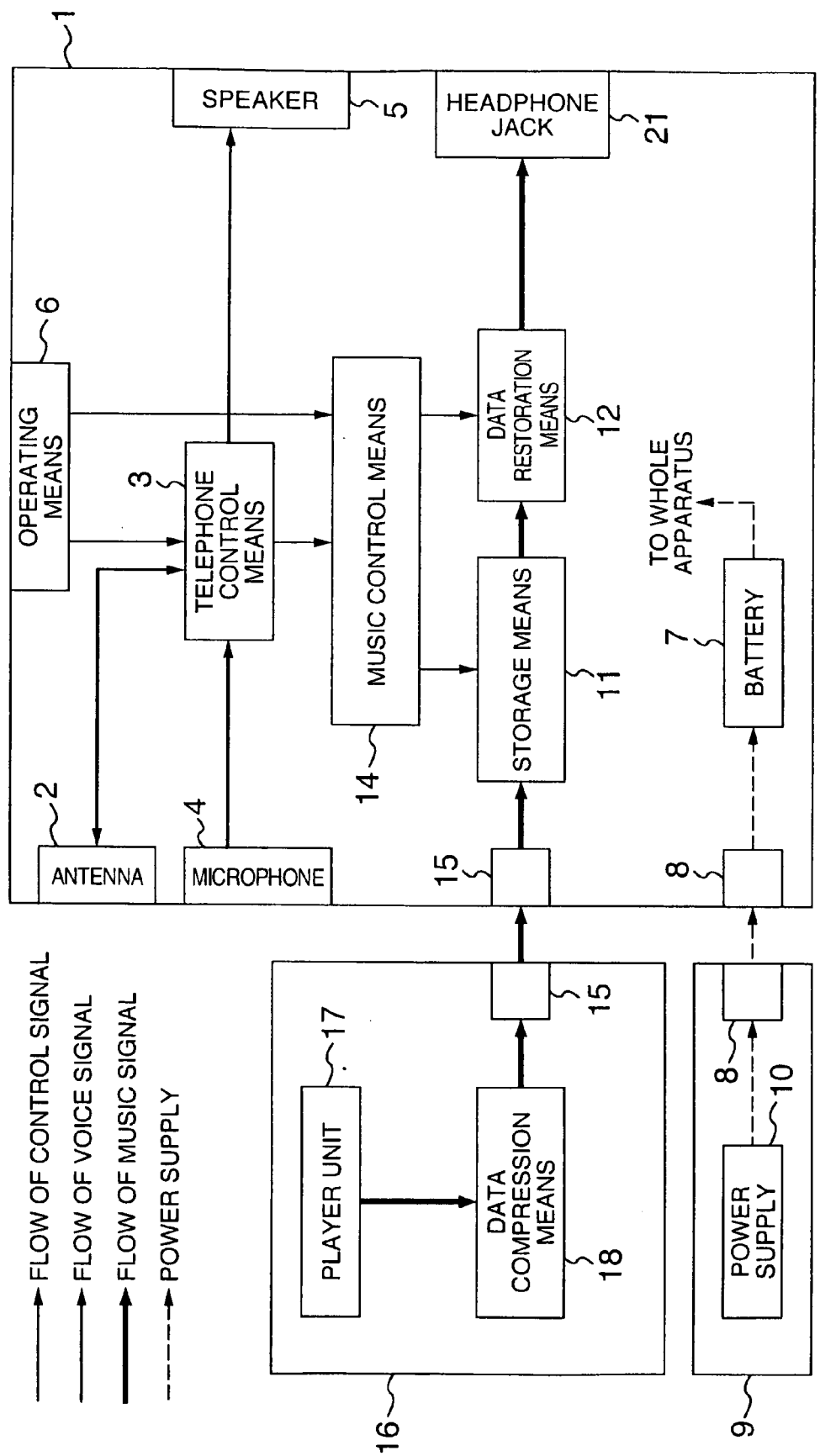
FIG. 7 is a block diagram of a portable telephone apparatus and peripheral devices according to a seventh embodiment of the invention.

FIG. 7 is a block diagram showing a portable telephone apparatus and peripheral devices according to a seventh embodiment. The different points of FIG. 7 from the first embodiment will be described below.

In FIG. 7, numeral 21 designates a headphone jack, through which the music signal reproduced by the data restoration means 12 can be heard through the headphone. The voice signal outputted from the telephone control means 3, on the other hand, is directly outputted from the speaker 5. This double system of the voice output means can realize a similar function to the first embodiment with a simple circuit configuration. At the same time, the sound quality can be improved by separating the circuits. Also, in the case where the telephone set is in off-hook, judging from the key operation of the operating means 6 or the busy mode of the telephone set, the music control means 14 may suspend the operation of the data restoration means 12 and mutes the music signal.

The aforementioned configuration provides a portable telephone apparatus capable of music reproduction.

With the portable telephone apparatus according to this invention, unlike the conventional portable telephone apparatus, the user wanting to use both the phone and music functions is not required to carry both the portable telephone apparatus and the portable audio apparatus at the same time, but a single portable telephone apparatus can realize both the phone function and the music reproduction function also very conveniently.

Also, in view of the fact that the audio player having the function of compressing the music data for various media and downloading it to the portable telephone apparatus is integrated with the charger, the peripheral devices required for charging the battery and downloading the music data can be integrated into a single device for an improved functionality. As a result, the time for charging is saved thereby to compensate for the power consumption of the portable telephone apparatus due to the downloading operation.

Also, the configuration is such that the music data can be downloaded over the radio wave from the base station, and therefore the audio apparatus for compression and downloading is eliminated.

Further, since the voice signal is mixed with the music signal and outputted from the speaker or transmitted to the other party of speech, the conversation with a background music can be enjoyed or the music can be furnished to the other party as a waiting message while the busy state is suspended.

Furthermore, the communication means for compression and downloading between the audio apparatus and the portable telephone apparatus is capable of bidirectional communication, and therefore the retransmission is facilitated in case of a communication error which may occur during the download operation. Also, the selection of a number to be downloaded or the timing of starting downloading can be set by the operation of the portable telephone apparatus.

In addition, since the storage means is removable, the block for downloading is eliminated, and the user can enjoy various numbers simply by replacing the storage means.

Further, the voice signal is outputted from the speaker and the music signal is outputted from the headphone jack, and therefore a similar function can be realized with a simple circuit configuration. Also, the sound quality is improved by separating the circuits.

What is claimed is:

1. A portable telephone apparatus comprising:
an antenna for holding communication with a base station or a parent unit;
a microphone;
a speaker;
operation keys and a display unit used by a user for operating the apparatus;
a telephone control unit for modulating a voice signal received from the microphone and outputting the modulated signal to the antenna and demodulating a radio signal received through the antenna to extract a demodulated voice signal;
a chargeable battery for supplying power to the apparatus;
a storage unit for storing compressed music data;
a data restoration unit for reading and expanding the data stored in the storage unit and reproducing a music signal from the expanded data; and
a mixing unit for mixing the demodulated voice signal with the reproduced music signal to produce a mixture signal that is output to the speaker.

2. The portable telephone apparatus of claim 1 further comprising a music control unit that controls a variable mixing ratio of the reproduced music signal and the demodulated voice signal within the mixture signal.

3. The portable telephone apparatus of claim 1 further comprising a music control unit that adjusts the volume of the mixture signal provided to the speaker in accordance with an operation of said operating unit.

4. The portable telephone apparatus of claim 1 further comprising a music control unit that adjusts the volume of the mixture signal provided to the speaker in accordance with a busy mode state of the telephone apparatus.

5. The portable telephone apparatus of claim 1 further comprising a wire, radio, or optical communication unit for downloading the compressed music data to the storage unit from an external source.

6. The portable telephone apparatus of claim 5 wherein the communication unit provided bidirectional communication.

7. The portable telephone apparatus of claim 1 wherein the storage unit is removable.

8. The portable telephone apparatus of claim 1 wherein data related to the telephone apparatus including abbreviated dialing information and data including memo data, produced by an operation of the operating unit, as well as the compressed music data are read from and written to the storage unit.

9. The portable telephone apparatus of claim 1 wherein the telephone control unit demodulates compressed music data, received in the radio signal arriving from the base station or the parent unit, to produce arriving compressed music data for storage in the storage unit.

10. A portable telephone apparatus comprising:
an antenna for holding communication with a base station or a parent unit;
a voice input unit including a microphone;
a voice output unit including a speaker or a headphone;
an operating unit including keys and a display unit manipulated by a user operating the apparatus;
a telephone control unit for modulating a first mixture signal and outputting the modulated signal to the antenna and demodulating a radio signal received through the antenna to extract a demodulated voice signal;
a chargeable battery for supplying power to the apparatus;
a storage unit for storing a compressed music data;
a data restoration unit for reading and expanding the data stored in the storage unit and reproducing a music signal from the expanded data;
a first mixing unit for mixing a voice signal received from the voice input unit with the reproduced music signal to produce the first mixture signal; and
a second mixing unit for mixing the demodulated voice signal with the reproduced music signal to produce a second mixture signal that is provided to the voice output unit; wherein
a mixing ratio of the signals mixed in the first mixing unit or the second mixing unit is changed by an operation of the operating unit.

11. A portable telephone apparatus comprising:
an antenna for holding communication with a base station or a parent unit;
a voice input unit including a microphone;
a voice output unit including a speaker or a headphone;
an operating unit including keys and a display unit manipulated by a user for operating the apparatus;
a telephone control unit for modulating a first mixture signal and outputting the modulated signal to the antenna and demodulating a radio signal received through the antenna to extract a demodulated voice signal;
a chargeable battery for supplying power to the apparatus;
a storage unit for storing compressed music data;
a data restoration unit for reading and expanding the data stored in the storage unit and reproducing a music signal from the expanded data;
a first mixing unit for mixing a voice signal received from the voice input unit with the reproduced music signal to produce the first mixture signal;

a second mixing unit for mixing the demodulated voice signal with the reproduced music signal to produce a second mixture signal that is provided to the voice output unit; and a unit for changing a mixing ratio of the signals mixed in the first mixing unit according to a busy mode state of the telephone apparatus.

12. A portable telephone apparatus comprising:

an antenna for holding communication with a base station or a parent unit;

a voice input unit including a microphone;

a voice output unit including a speaker or a headphone;

an operating unit including keys and a display unit manipulated by a user operating the apparatus;

a telephone control unit for modulating a first mixture signal and outputting the modulated signal to the antenna and demodulating a radio signal received through the antenna to extract a demodulated voice signal;

a chargeable battery for supplying power to the apparatus;

a storage unit for storing compressed music data;

a data restoration unit for reading and expanding the data stored in the storage unit and reproducing a music signal from the expanded data;

a first mixing unit for mixing a voice signal received from the voice input unit with the reproduced music signal to produce the first mixture signal;

a second mixing unit for mixing the demodulated voice signal with the reproduced music signal to produce a second mixture signal that is provided to the voice output unit; and a unit for increasing a mixing ratio of the reproduced music signal in the first mixing unit when a busy mode is suspended by the operating unit.

13. A portable telephone apparatus comprising:

an antenna for holding communication with a base station or a parent unit;

a microphone;

storage unit for storing compressed music data;

data restoration unit for reading and expanding the compressed music data stored in the storage unit and reproducing a music signal from the expanded data; and mixing unit for mixing a voice signal received from the microphone with the reproduced music signal to produce a mixture signal; and telephone control unit for modulating the mixture signal and outputting the modulated mixture signal to the antenna and demodulating a radio signal received through the antenna to extract a demodulated voice signal for output to a speaker.

14. The portable telephone apparatus of claim 3 further comprising a music control unit that controls a variable mixing ratio of the reproduced music signal and the modulated voice signal within the mixture signal.

* * * * *